United States Patent [19]
Morita et al.

[11] Patent Number: 5,478,475
[45] Date of Patent: Dec. 26, 1995

[54] FLUID DISTRIBUTION APPARATUS, AN ARTIFICIAL MOVING BED, AND A CONTINUOUS ADSORPTION METHOD

[75] Inventors: Minoru Morita; Jun Ohno, both of Tokyo, Japan

[73] Assignee: Tsukishima Kikai Co., Ltd., Tokyo, Japan

[21] Appl. No.: 154,077

[22] Filed: Nov. 18, 1993

[51] Int. Cl.⁶ .................................................. B01D 15/00
[52] U.S. Cl. ..................... 210/676; 137/625.15; 210/264
[58] Field of Search ........................ 137/625.15; 210/676, 210/264, 278, 284, 289, 291

[56] References Cited

U.S. PATENT DOCUMENTS

| | | | |
|---|---|---|---|
| 2,751,092 | 6/1956 | Gourdon et al. | 214/11 |
| 3,706,812 | 12/1972 | Derosset et al. | 55/344 |
| 4,633,904 | 1/1987 | Schumann et al. | 137/625.15 |
| 4,923,616 | 5/1990 | Hirata et al. | 210/676 |

FOREIGN PATENT DOCUMENTS

| | | |
|---|---|---|
| 1078768 | 11/1954 | France . |
| 1352824 | 1/1964 | France . |
| 1506445 | 12/1967 | France . |
| 51-18392 | 6/1976 | Japan . |
| 53-51179 | 5/1978 | Japan . |
| 53-76975 | 7/1978 | Japan . |
| 54-90072 | 7/1985 | Japan . |
| 54-152668 | 3/1986 | Japan . |
| 54-102288 | 8/1986 | Japan . |
| 9105705 | 5/1991 | WIPO . |

OTHER PUBLICATIONS

Patent Abstracts of Japan, vol. 12, No. 79 (P-676).

*Primary Examiner*—Ivars Cintins
*Attorney, Agent, or Firm*—Antonelli, Terry, Stout & Kraus

[57] ABSTRACT

The artificial moving bed of this invention includes a fluid distribution apparatus consisting of an upper fluid distributor and a lower fluid distributor, and a plurality of processing chambers held and fixed between the upper and lower fluid distributors. Each fluid distributor has a rotary valve held in a slidable condition between a fixed supply valve and a pipe fixing plate. These fluid distributors are formed with fluid passages therein. The processing chambers are divided into several groups, each assigned a specific process. Using this artificial moving bed, the processing chambers are operated simultaneously and when the process is finished in each group of processing chambers, the fluid distribution apparatus is rotated clockwise when viewed from above so that each group of chambers proceeds to the next process, thus allowing continuous adsorption operation.

15 Claims, 6 Drawing Sheets

| DIRECTION OF FLOW | | UPPER FLUID DISTRIBUTOR | LOWER FLUID DISTRIBUTOR |
|---|---|---|---|
| ⊗← | FROM THIS SIDE OF THE PAPER TOWARD THE FAR SIDE | UPWARD | DOWNWARD |
| ⊙← | FROM THE OTHER SIDE OF THE PAPER TOWARD THIS SIDE | DOWNWARD | UPWARD |

5,478,475

FLUID DISTRIBUTION APPARATUS, AN ARTIFICIAL MOVING BED, AND A CONTINUOUS ADSORPTION METHOD

BACKGROUND OF THE INVENTION

1. Field of the Invention

The present invention relates to a fluid distribution apparatus, to an artificial moving bed using the fluid distribution apparatus, and also to a continuous adsorption method for continuously operating adsorption chambers by using the artificial moving beds.

2. Description of the Prior Art

As a means of separating and purifying fluids, an adsorption method has been in wide use which employs silica gel, activated carbon, zeolite and ion-exchange resins as adsorbents.

Among representative adsorption methods are (a) the Parex method and the Molex method, which involve dividing an adsorbent-packed fixed bed into several stages and performing adsorption, desorption and regeneration processes successively and parallelly in the packed beds by manipulating a rotary switching valve. These methods produce effects similar to those obtained by the continuous countercurrent method using adsorbent-packed moving beds. The Parex method and the Molex method are employed for purifying paraxylene and oil refining, respectively (as described in UOPSORB-10-09-85, for example).

Another known method (b) (for example, Japanese Patent Publication No. 32482/1985) connects a plurality of ordinary adsorption chambers with each other by pipes, feeds a liquid or fluid to be processed, an adsorption liquid and a regeneration liquid to each of the adsorption chambers, provides these adsorption chambers with piping and valves to extract these liquids from the chambers, and operates the valves successively according to a time schedule to perform such operations as adsorption, desorption and cleaning in parallel.

In still another popular method (c) (for example, ADVANCE SEPARATION TECHNOLOGIES Inc. ISEP system), a number of adsorption chambers are fixedly mounted in circle on a circular rotatable stand; the rotatable stand is turned to rotate these adsorption chambers; an outlet pipe and an inlet pipe connected to each of the adsorption chambers are connected to a pair of upper and lower stationary valves; as the adsorption chambers are rotated, these liquids are supplied to each adsorption chamber successively through the stationary valves to carry out adsorption and desorption continuously.

SUMMARY OF THE INVENTION

The first method (a) using the rotary valve normally have the flow inside the beds directed downward. Petroleum products and petrochemicals contain few solids as impurities and thus can be subjected to adsorption, desorption and regeneration processes either in an upward countercurrent or a downward countercurrent flow. Thus, this method has found applications in oil and petrochemical refining. Fermented liquids and chemical industry products, on the other hand, often contain colloidal solids that are not easy to remove by filtration. When such solids are contained, the fluid may be discharged as an upward countercurrent flow and it is generally desirable to employ the upward countercurrent flow for the desorption process. For these reasons, the fermented liquids and chemical industry products cannot utilize the first method (a) that uses a downward countercurrent flow and a rotary valve, limiting the kinds of substances that can be treated by the method (a).

The second method (b), which uses a number of adsorption chambers successively and parallelly, has a problem that the switching operation of the valve is complex and that to perform the complex valve switching operation without an error requires an expensive computer and associated control equipment.

As to the third method (c) that uses a number of rotatable adsorption chambers, although it can overcome the drawbacks experienced with the methods (a) and (b), it is required to operate and rotate a large number of heavy adsorption chambers packed with large amounts of adsorbents simultaneously, making the structure complicated and maintenance difficult and making it necessary to extend the cycle time. Moreover, a large power is required to move a number of heavy adsorption chambers. Because of these problems, the third method (c) cannot be applied for the adsorption process that uses large chambers.

To eliminate the problems of the method (c), there is proposed a method, in which a number of adsorption chambers are arranged in circle and a distributor to which the adsorption chambers are connected is disposed at the center of the circle, and in which the adsorption, desorption and regeneration are performed successively in each of the adsorption chambers without moving or rotating the adsorption chambers (as disclosed, for example, in Japanese Patent Publication No. 18392/1976, 12673/1977, 76975/1978, 32482/1985, 3523/1986, and 7845/1986). This method, however, has the drawbacks of complex operation, low yields, low concentrations of products and low level of reliability and thus has not yet been put into practical use.

In an effort to develop an adsorption apparatus with the features listed below, the inventors of this invention have conducted intensive research, which has led us to this invention.

The features of the adsorption apparatus of this invention are:

(1) that when solid impurities accumulate, the apparatus can be subjected to cleaning to remove solid impurities, i.e. the apparatus can be operated in an upward countercurrent flow;

(2) that in processes such as adsorption and cleansing, the apparatus can be operated in either the upward or downward countercurrent flow;

(3) that the adsorption chambers can be operated in a stationary condition, without having to be moved or rotated; and (4) that the cycle time can be shortened reducing the amount of adsorbents packed in each chamber.

It is an object of the present invention to provide a fluid distribution apparatus, comprising:

an upper fluid distributor; and a lower fluid distributor;

said each fluid distributor comprising:
  a fixed supply valve;
  a rotary valve rotated in sliding contact with the fixed supply valve; and
  a pipe fixing plate in sliding contact with the rotary valve;

said rotary valve being held between the fixed supply valve and the pipe fixing plate, the rotary valve having a fluid distribution section and a communication section, the fluid distribution section having a plurality of passages and the communication section having a plurality of communication passages and connection channels;

said fixed supply valve having a plurality of supply grooves formed in a sliding contact surface thereof and a plurality of supply nozzle ports cut in a circumferential wall thereof for communicating the supply grooves with supply nozzles;

said pipe fixing plate having a plurality of communication passages connected to adsorption chambers and a plurality of connection passages connected at one of their ends with the connection channels and at the other of their ends with connection pipes;

wherein the supply nozzle ports and the supply grooves in the fixed supply valve, the passages in the fluid distribution section of the rotary valve, the communication passages in the communication section of the rotary valve, and the communication passages in the pipe fixing plate are successively connected to form fluid supply passages running through the fluid distributor; and wherein the connection passages in the pipe fixing plate, the connection channels in the rotary valve, and other communication passages in the pipe fixing plate are successively connected to form chamber-to-chamber connection passages running through the fluid distributor, the chamber-to-chamber connection passages being arranged according to the shape of the connection channels in the communication section of the rotary valve.

Another object of this invention is to provide an artificial moving bed including such a fluid distribution apparatus, wherein adsorption chambers are disposed between the communication passages formed in the both pipe fixing plates of the upper and lower fluid distributors and connection pipes are disposed between the connection passages formed in the both pipe fixing plates.

In such an artificial moving bed, it is still another object of this invention is to provide a continuous adsorption method which performs the adsorption process without rotating the adsorption chambers and associated devices, i.e. while keeping the adsorption chambers and associated devices stationary.

In the fluid distribution apparatus and the artificial moving bed according to this invention, the passages in the fluid distribution section of the rotary valve, the communication passages in the communication section of the rotary valve, and the communication passages in the pipe fixing plate are set equal in number. The number of the supply grooves in the fixed supply valve is set at least equal to the number of kinds of fluid supplied to the processing chambers. In the process of adsorption, for instance, four kinds of fluid—a source liquid, a cleaning liquid, a desorption liquid and a regeneration liquid—are normally supplied to the adsorption chambers, so that the number of supply grooves in the fixed supply valve must be four or more.

In the fluid distribution apparatus and the artificial moving bed according to this invention, the upper and lower fluid distributors may each have the fixed supply valve formed cylindrical and the liquid distribution section of the rotary valve formed as a circular pillar inscribed in the cylindrical fixed supply valve (such a fluid distributor may be referred to as a vertical type fluid distributor). Alternatively, the fixed supply valve and the rotary valve may be formed as disks in sliding contact with each other (such a fluid distributor may be referred to as a lateral type fluid distributor). Further, the upper and lower fluid distributors may both be formed as a vertical type or as a lateral type; or one of them may be formed as a vertical type and the other a lateral type.

It is preferred that the pipe fixing plate and/or the fixed supply valve be supported on a stationary mount to fixedly support the fluid distribution apparatus.

The rotary valve is held between the fixed supply valve and the pipe fixing plate. In the lateral type fluid distributor, the fixed supply valve and the pipe fixing plate are preferably coupled and fastened together by a clamping device.

The fluid distribution section and the communication section of the rotary valve are formed integral as a one-piece disk-shaped rotary valve in the case of the lateral type fluid distributor; and in the vertical type fluid distributor, the cylindrical fluid distribution section and the disk-shaped communication section are connected together and formed integral, with their rotating axes aligned, so that the rotary valve as a whole, when viewed in the vertical cross section, looks like a disk with a raised portion on the top or a circular pillar.

In each of the processes including adsorption, cleaning, desorption and regeneration, the flow of fluid supplied and the speed of fluid moving in each processing chamber can be adjusted so that the times required for each of the processes are virtually equal, and/or a plurality of processing chambers or chambers can be divided into two or more groups, in each of which the processing chambers are connected in series or in parallel with each other. The number of processing chambers in each group is determined as necessary. Normally, five or less and preferably two or three processing chambers are used in each group.

In this way, a single process generally consists of a plurality of processing chambers connected in series or in parallel that are used as one group. In the former case, i.e. when connected in series, the processing chambers are interconnected through the connection pipes and the connection channels. In the latter case, i.e. when connected in parallel, the processing chambers are connected one-to-one to pipes branching from the communication passage in the communication section.

To describe the former case in more detail, the passages that connect the processing chambers in series include: three passages in one of the fluid distributors, say, upper fluid distributor—a connection passage in the pipe fixing plate, a connection channel in the communication section of the rotary valve and a second communication passage in the pipe fixing plate—and corresponding three passages in the other fluid distributor, say, lower fluid distributor—a connection passage in the pipe fixing plate, a connection channel in the communication section of the rotary valve and a second communication passage in the pipe fixing plate. In each group, the processing chambers, whose inlet and/or outlet are connected to the communication passages in the communication sections of the rotary valves through the communication passages in the pipe fixing plates, are only those at both ends of the group. The inlet and/or outlet of other intermediate processing chambers are not connected to the communication passages in the communication sections of the rotary valves.

When a process uses only one processing chamber, there is no need to use a tower-to-tower connection passage or to form a connection channel, so that the inlet and/or outlet of the processing chamber are connected only to the communication passages in the communication sections of the rotary valves through the communication passages in the pipe fixing plates.

Thus, the communication section of the rotary valve has connection channels formed therein in shapes and at locations that meet the requirements of the adsorption program and/or manufacturing conditions.

By sending fluids through the passages in reverse direction, the fluids can be made to flow in reverse direction through the processing chambers.

The rotary valves are turned, as by rotating a rotary shaft passing through the center of the pipe fixing plates by a driving unit such as a motor. The rotary shaft, which couples the rotary valves of the upper and lower fluid distributors, may be either a single continuous rotary shaft or two rotary shafts connected together with their axes aligned. It is also possible to directly connect the rotary valves of the upper and lower fluid distributors as by coupling, without using the rotary shaft. The rotary shaft may be connected to the driving unit either at the end of the rotary shaft or at an intermediate point between the two rotary valves. In the former case, the end of the rotary shaft passing through and beyond the center of the fixed supply valve is connected with the driving unit through a reduction gear. In the latter case, a bevel gear mounted on the rotary shaft may be connected directly, or by way of a reduction gear if necessary, to the driving unit.

The rotary valves may be rotated either continuously while the processing chambers are in operation or intermittently only when the processing chambers are switched to the next processes.

Common sealing techniques are applied to the sealing between sliding surfaces and to the connections between passages or communication passages.

In this invention, the word "adsorption" is used in a wide sense to include, in addition to adsorption in a narrow sense of the word, absorption, inclusion, occlusion, and retention accompanied by chemical reaction. The "adsorption" also includes a series of processes associated with the adsorption process, such as desorption, cleaning and regeneration.

DETAILED DESCRIPTION OF EMBODIMENTS

Figure 1:
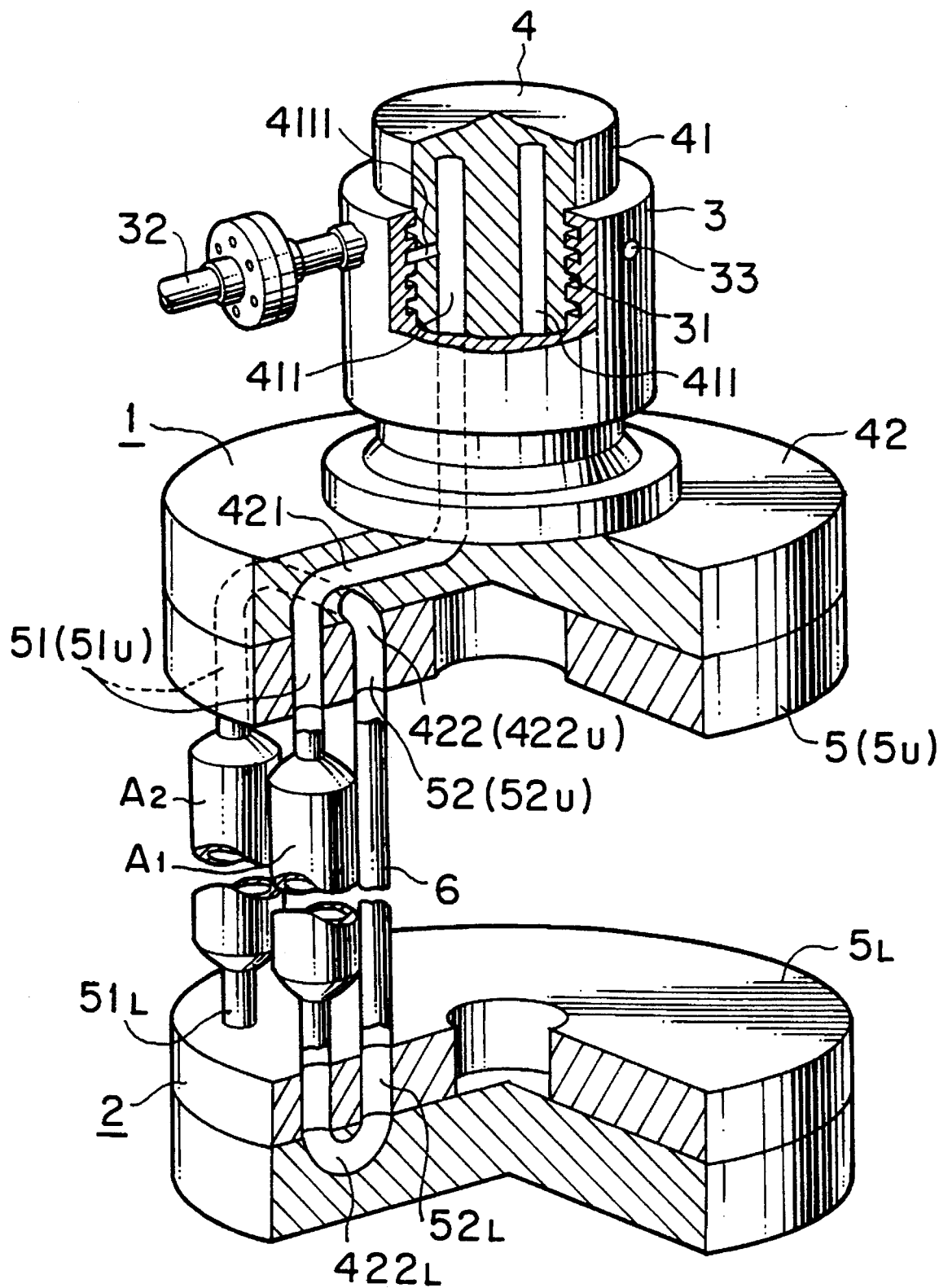
FIG. 1 is a partly cutaway perspective view showing an artificial moving bed that uses a fluid distribution apparatus having vertical type fluid distributors at the top and the bottom thereof.

By referring to the accompanying drawings, the fluid distribution apparatus and the artificial moving bed will be described in detail. A case of adsorption performed by using the artificial moving bed is taken up as an example. It is noted that the present invention is not limited whatsoever by the embodiment and the example use.

The drawings are intended to explain the working principle of the fluid distribution apparatus and the artificial moving bed of this invention and omit details of such components as seals between the surfaces in sliding contact and seals at connections between passages or communication paths. The relative sizes of parts are not shown to correct proportions.

In the following description, reference numerals representing portions included in or associated with an upper fluid distributor and a lower fluid distributor are given subscripts "U" and "L" respectively.

Figure 2:
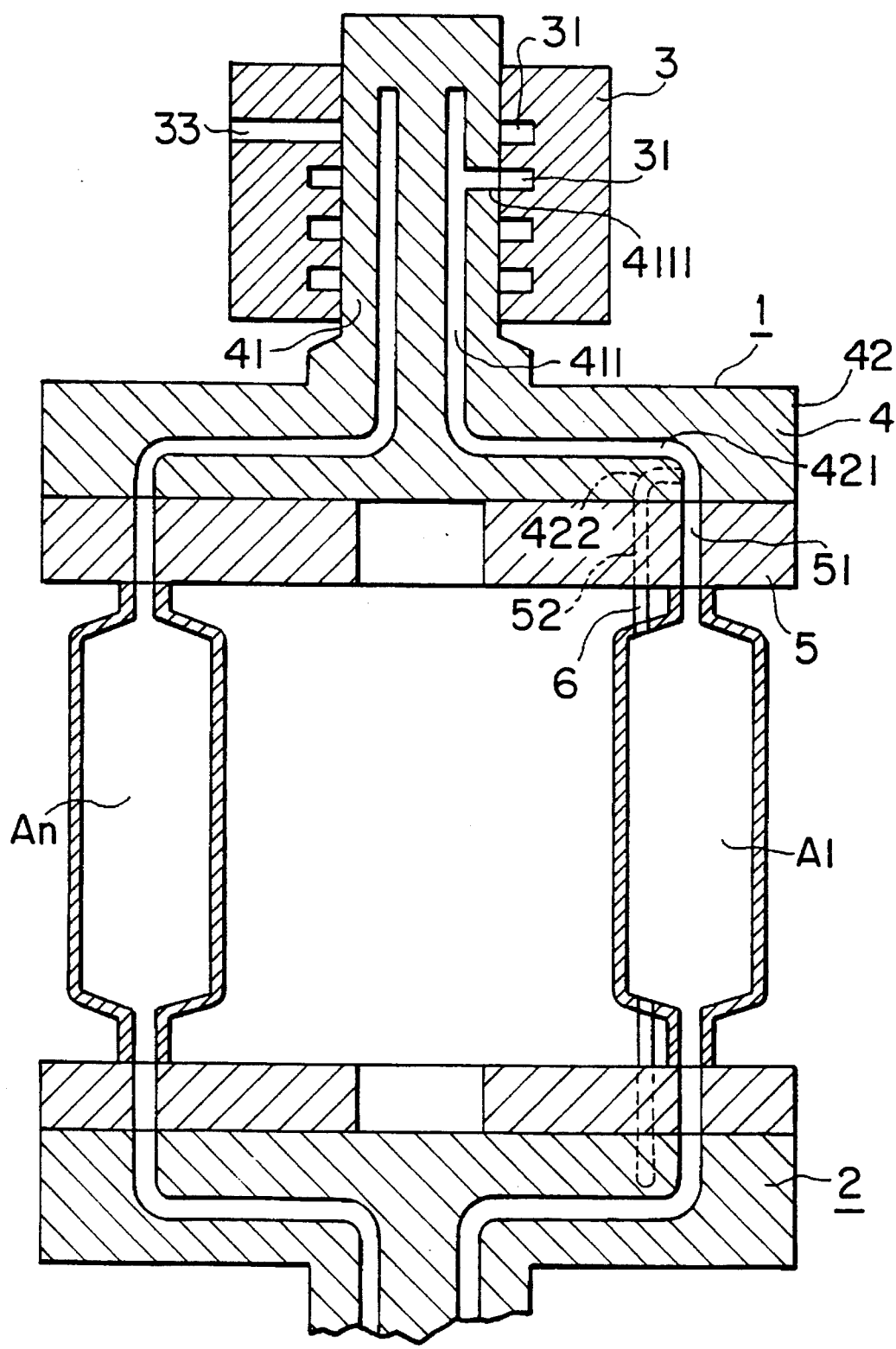
FIG. 2 is a cross section of the artificial moving bed of FIG. 1, taken along a plane including the rotating axis of the rotary valve, communication openings of a liquid distribution section of the rotary valve and communication passages in a communication section of the rotary valve.

The artificial moving bed, which uses a fluid distribution apparatus consisting of vertical type, upper and lower fluid distributors of a cylindrical shape and in which a fixed supply valve is cylindrical and a fluid distribution section of a rotary valve is inscribed in the cylindrical fixed supply valve, is shown in FIG. 1 and FIG. 2. FIG. 1 is a partly cutaway perspective view of the artificial moving bed and FIG. 2 is a cross section cut along a plane containing a rotating axis of the rotary valve, communication ports formed in the fluid distribution section of the rotary valve and communication passage in a communication section. FIGS. 1 and 2 omit a lower part of the lower fluid distributor and a rotating shaft that connects the lower surface of the rotary valve in the upper fluid distributor and the upper surface of the rotary valve in the lower fluid distributor.

The artificial moving bed of FIG. 1 and FIG. 2 include an upper fluid distributor 1 and a lower fluid distributor 2. Between the upper and lower distributors are arranged and held a plurality of adsorption chambers $A_1, \ldots, A_8$ and connection pipes 6. In FIGS. 1 and 2, two such adsorption chambers are shown to be connected in series by the connection pipes and the communication chambers.

The upper fluid distributor 1 includes a fixed supply valve 3, a rotary valve 4 and a pipe fixing plate 5.

The fixed supply valve 3 has a cylindrical circumferential wall whose inner surface is formed with four substantially horizontal supply grooves 31. The circumferential wall is also formed with supply nozzle ports 33 that connect the supply grooves 31 to supply nozzles 32. The rotary valve 4 comprises a fluid distribution section 41 and a communication section 42. The fluid distribution section 41 is a circular column that is rotated while in sliding contact with the inner circumferential surface of the fixed supply valve 3. The fluid distribution section 41 has four passages 411 formed therein extending along the rotating axis thereof. These passages 411 are arranged in circle at virtually equal intervals. Each of these passages 411 is provided with a communication port 4111 that connects the passage 411 with one of the supply grooves 31.

The communication section 42 of the rotary valve 4 is arranged in contact with and formed integral with the lower end surface of the fluid distribution section 41 of the rotary valve 4 in such a way that the communication section 42 and the fluid distribution section 41 share the common rotating axis. The communication section 42 is disc-shaped. Therefore, the rotary valve 4 as a whole, when viewed in cross section taken along the plane containing the rotating axis, is shaped like a rectangle with the top raised. The communication section 42 has four communication passages 421 and four connecting chambers 422 formed therein. The communication passages 421 extend radially outwardly at virtually equal center angles. The ends of the communication passages 421 in the communication section 42 on the center side are directed upward and connected with the passages 411 in the fluid distribution section 41. The other ends of the communication passages 421 on the peripheral side are directed downward and open at the underside of the communication section 42. Thus, in the rotary valve 4 are formed fluid supply passages each consisting of the supply nozzle port 33, the supply groove 31, the communication port 4111, the passage 411, and the communication passage 421. The connecting chamber 422 has its both ends open at the underside of the communication section 42. One end of the connecting chamber 422 is open at the periphery of the communication section 42 and connected to a communication passage 51 in the pipe fixing plate 5 that is not in communication with the communication passage 421. The other end of the connecting chamber 422 is open at a point closer to the center of the communication section 42 than the peripheral-side end of the communication passage 421 and is connected with a connection passage 52 in the pipe fixing plate 5. The four connecting chambers 422 connect eight adsorption chambers $A_1, \ldots, A_8$ with adjacent chambers, thereby dividing them into four groups of adsorption chambers.

The pipe fixing plate 5 is shaped like a disk with a radius substantially equal to that of the communication section 42 of the rotary valve 4. The top surface of the pipe fixing plate 5 is put in contact with the undersurface of the communication section 42 of the rotary valve 4. The communication passages 51 and the connection passages 52, which communicate with the communication passages 421 and the connecting chambers 422, respectively, the latter two kinds of passages opening at the underside of the communication section 42 of the rotary valve 4, are cut through the pipe fixing plate 5 along the rotating axis of the rotary valve 4.

Below the upper fluid distributor 1, a lower fluid distributor 2, virtually the same in construction as the upper fluid distributor 1 is arranged upside down, i.e. arranged plane-symmetrical with respect to the upper fluid distributor 1. Adsorption chambers $A_1, A_2, \ldots, A_8$ are installed between the communication passages 51U that open at the underside of the pipe fixing plate 5U of the upper fluid distributor 1 and the communication passages 51L that open at the top surface of the pipe fixing plate 5L of the lower fluid distributor 2. Connection pipes 6 are arranged between the openings of the connection passages 52U at the undersurface of the pipe fixing plate 5U for the upper fluid distributor 1 and the openings of the connection passages 52L at the top surface of the pipe fixing plate 5L for the lower fluid distributor 2.

These adsorption chambers and connection pipes are held stationary, not rotatable nor movable.

In this artificial moving bed, the adsorption is carried out as follows. When a source liquid is supplied from a supply nozzle 32U, it flows through a fluid supply passage—which consists of a supply nozzle port 33U, supply groove 31U, communication port 4111U, passage 411U, communication passage 421U and communication passage 51U—to the inlet of the adsorption chamber $A_1$ filled with adsorbents, and from there passes down through the adsorption chamber $A_1$ and is discharged from the outlet of the chamber $A_1$. The liquid further passes through a chamber-to-chamber connection passage—formed by communication passage 51L, connecting chamber 422L, connection passage 52L, connection pipe 6, connection passage 52U, connecting chamber 422U and communication passage 51U—to the inlet of the adsorption chamber $A_2$ packed with adsorbents and from there passes down through the adsorption chamber $A_2$ and is discharged from the outlet of the chamber $A_2$. The discharged liquid is made to flow in the reverse direction through a fluid supply passage in the lower fluid distributor 2, which is formed in a way similar to the fluid supply passage in the upper fluid distributor 1, until it is discharged out of the artificial moving bed. In this way, the adsorption process is carried out in the adsorption chambers $A_1$ and $A_2$.

Likewise, a cleansing liquid, for example, is supplied from a second supply nozzle 32 to pass through a second fluid supply passage like the one mentioned above and to a second group of adsorption chambers that has finished the adsorption process. In this group of adsorption chambers, therefore, the cleansing process is performed simultaneously with the adsorption process being carried out in the first group of adsorption chambers.

Similarly, a desorption liquid, for instance, is supplied from a third supply nozzle 32 to pass through a third fluid supply passage, which is similar to the preceding supply passages, and to a third group of adsorption chambers that has completed the cleansing process. This group of adsorption chambers, therefore, perform the desorption process simultaneously with other processes.

In the same way, from a fourth supply nozzle 32, a regeneration liquid may be supplied so that a fourth group of adsorption chambers that has finished the desorption process undergoes the regeneration process at the same time.

While the adsorption chambers are undergoing each process, the rotary valves 4U and 4L may be continuously rotated without being stopped. It is also possible to stop the rotary valves 4U and 4L while the adsorption chambers are operated in each process and rotate them only when the operation is switched from one process to another.

In the former case, while a process is in operation, a liquid is passed through the adsorption chambers intermittently.

In the latter case, when the adsorption, cleansing, desorption and regeneration processes in the adsorption chambers are finished virtually at the same time by the rotating valve 4U and 4L, the liquid supply to each adsorption chamber is stopped and the rotary valves 4U and 4L are both rotated to change the relative positions of the communication passages 51U, 51L and connection passages 52U, 52L with respect to the outlet and inlet of the adsorption chambers so that the adsorption chambers that have finished the adsorption, cleansing, desorption and regeneration processes will proceed to the next process, i.e. cleansing, desorption, regeneration and adsorption processes, respectively.

It is possible to pass the liquid in a reverse direction from the bottom to the top of the adsorption chamber by supplying the liquid from the supply nozzle 32L of the lower fluid distributor 2.

Figure 3:
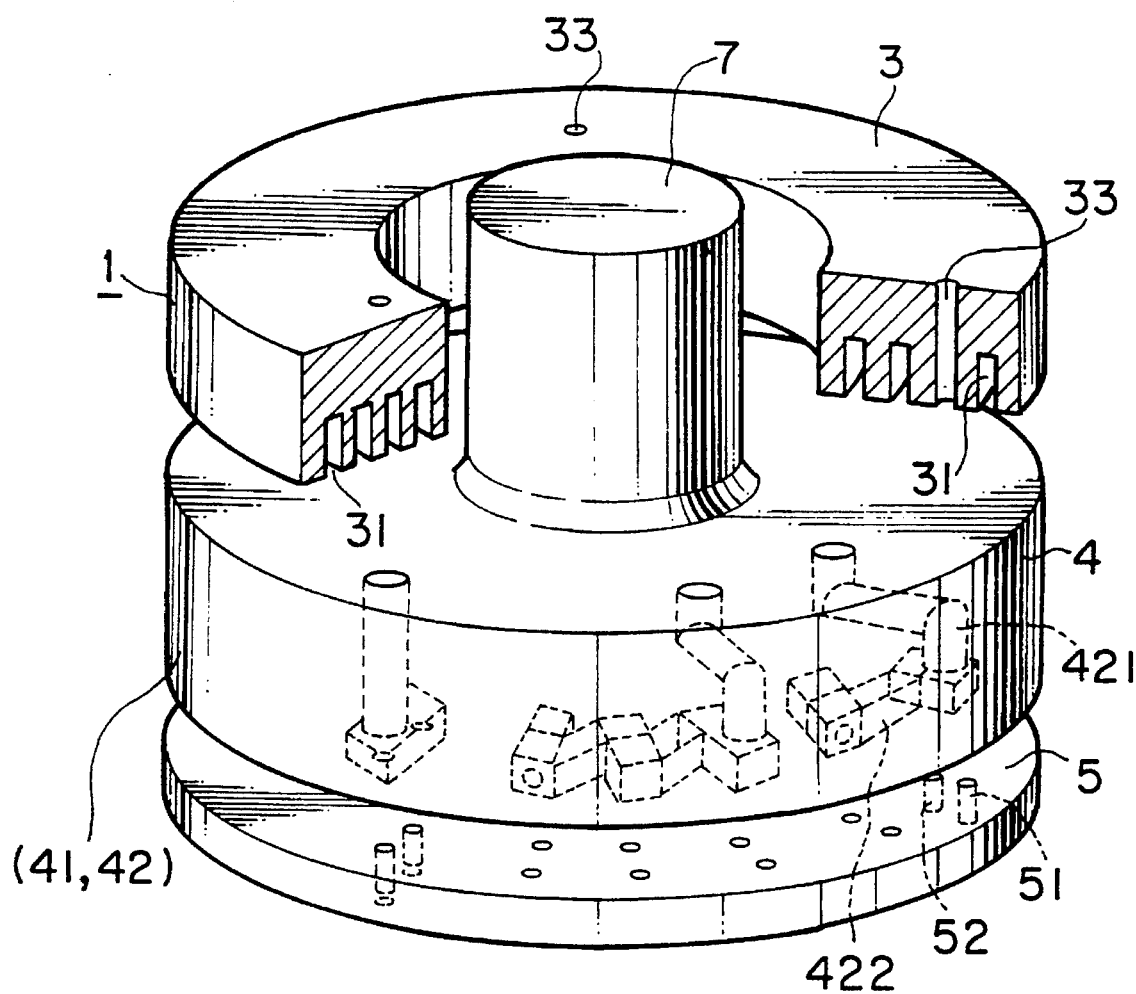
FIG. 3 is a partly cutaway perspective view of a lateral type, upper fluid distributor.

FIG. 3 shows a partly cutaway perspective view of a lateral type upper fluid distributor used in an artificial moving bed, which includes lateral type fluid distributors at the top and bottom thereof with the fixed supply valve and the rotary valve both formed as a disk.

In FIG. 3, which shows the lateral type upper fluid distributor 1 with both of the fixed supply valve 3 and the rotary valve 4 shaped like a disk, the lateral type upper fluid distributor is essentially the same as the upper (vertical type) fluid distributor of the artificial moving bed shown in FIG. 1, except that (1) the disk-shaped rotary valve 4 is clamped and held between the fixed supply valve 3 and the disk-shaped pipe fixing plate 5 and that (2) the fixed supply valve 3 and the rotary valve 4 are both disk-shaped and of lateral type. In this lateral type upper fluid distributor 1, the rotary valve 4 is formed integral with a liquid distribution section 41 and a communication section 42, with the upper half and lower half of the rotary valve 4 corresponding in terms of function to the liquid distribution section and the communication section.

Connecting chambers 422 provided in the communication section 42 are bent in complex forms when a plurality of adsorption chambers are connected.

Figure 4:
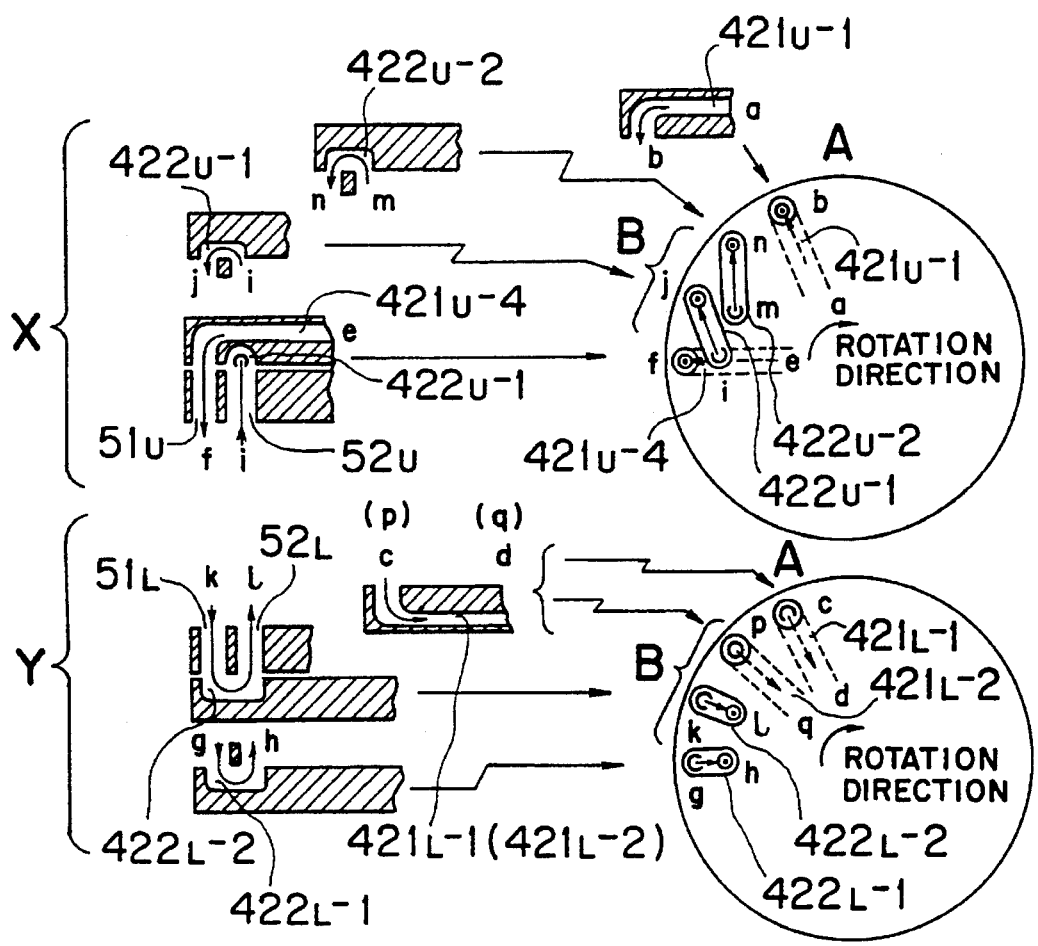
FIG. 4 is a schematic diagram showing the shapes of connecting chambers in the communication section of the rotary valve in the upper and lower fluid distributors.

The shapes of connecting chambers in the communication section of the rotary valve in the upper and lower fluid distributors are schematically shown in FIG. 4.

In FIG. 4, X (upper half) represents the upper fluid distributor and Y (lower half) represents the lower fluid distributor.

In FIG. 4, the upper half at the right is a bottom view of the upper fluid distributor and the lower half at the right is a bottom view of the lower fluid distributor.

Further, in FIG. 4, the left halves represent end cross sections of the communication passages 421U, 421L and connecting chambers 422U, 422L cut along their major axes and which correspond to the bottom views of the upper and lower fluid distributors.

Referring to FIG. 4A, the communication passages 421U-1 and 421L-1 oriented in the 11-O'clock direction are shown to be directly connected, respectively, with communication passages 51U and 51L formed in the peripheral portion of the pipe fixing plates 5U and 5L, with the connecting chambers 422U and 422L omitted. Then, a fluid passage running through a, b, adsorption chamber (downward), c, and d is formed.

Referring to FIG. 4B, in the range between the 9-O'clock (horizontal) direction and 45 degrees upward, three adsorption chambers are interconnected at the upper and lower ends by two connection channels 422U-1 and 422U-2/422L-1 and 422L-2 to form one group. Of the three adsorption chambers, the chamber at one end of the group has its upper opening connected to the communication passage 421U-4 through the communication passage while the chamber at the other end has its lower opening connected to the communication passage 421L-2 through the communication passage 51L. Now, a fluid passage is formed running through e, f, adsorption chamber (downward), g, h, connection pipe, i, j, adsorption chamber (downward), k, 1, adsorption chamber (upward), connection pipe, m,n, connection pipe, p, and q.

Figure 5:
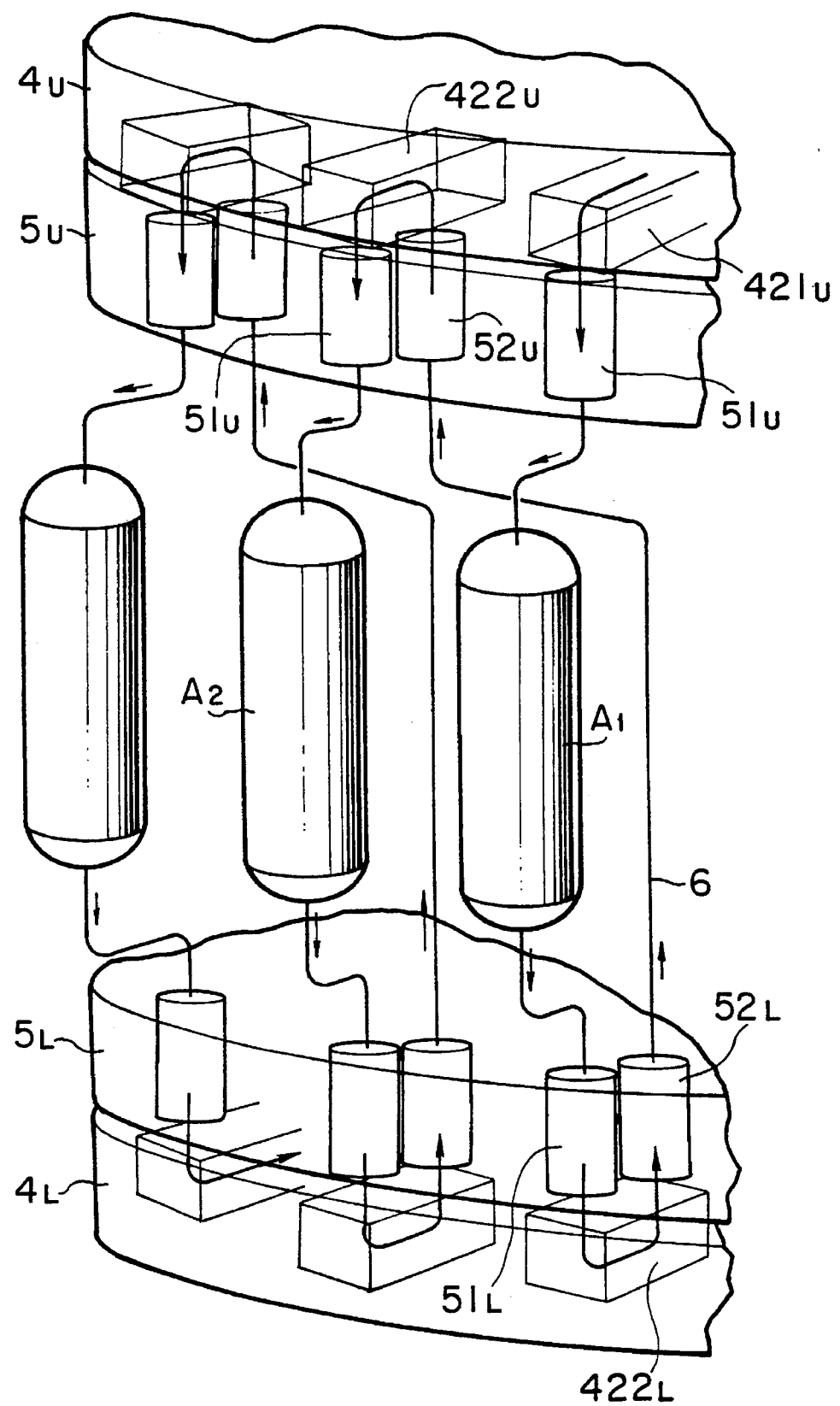
FIG. 5 is a partly cutaway perspective view of a lateral type, upper fluid distributor of FIG. 3 with the connecting chambers modified.

In the rotary valve 4U in FIG. 3, instead of providing the complex, bent connection channel 422U, it is possible to make the connection channel 422U straight and have it connected with the connection pipe 6 which is bent upstream of the communication passage 52U, as shown in FIG. 5.

Figure 6:
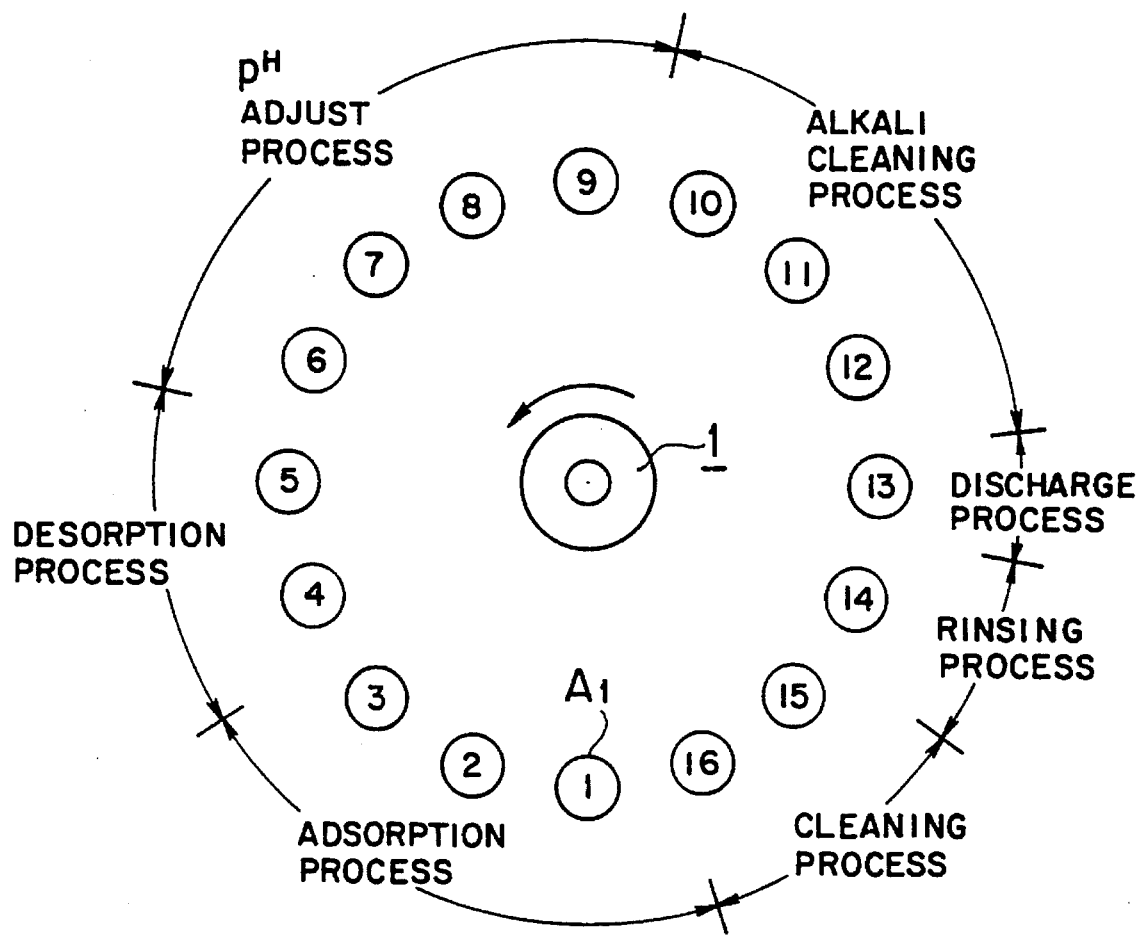
FIG. 6 is a schematic plan view of the artificial moving bed of this invention having 16 adsorption chambers divided into groups, showing the processes in each group of chambers being performed simultaneously.

FIG. 6 shows a plan view of an artificial moving bed having 16 adsorption chambers $A_1, A_2, \ldots, A_{16}$ divided into several groups, in which two or more processes are being performed simultaneously. That is, in FIG. 6, $A_1$ to $A_3$ represents an adsorption process, $A_4$ to $A_5$ desorption process, $A_6$ to $A_9$ a pH adjusting process, $A_{10}$ to $A_{12}$ alkali washing process, $A_{13}$ a discharge process, $A_{14}$ rinsing process, and $A_{15}$ to $A_{16}$ a cleaning process, all these processes being underway at the same time. In FIG. 6, when each process is finished in each group of adsorption chambers, the fluid distribution apparatus is rotated clockwise when viewed from above so that each group of chambers proceeds to the next process.

Example of Use

A fermented liquid containing amino acid produced by amino acid fermentation was adjusted to pH 3.0 by adding hydrochloric acid. This was followed by the pH-adjusted fermented liquid being passed down the adsorption chamber filled with ion exchange resin at the flow rate of 2.5 m³/hour to adsorb the amino acid. The adsorption chamber was then cleaned with deionized water and desorbed by caustic soda. Specifications of this adsorption chamber are as follows.

Number of adsorption chambers: 16

Size: 450Φ×1.2 mH

Kind of ion exchange resin: Amberlite 200C/411

Total amount of ion exchange resin used: 5 m³

The upper and lower fluid distributors have the nominal capacity of 4.0 m³/hour. They were operated at the driving power of 1.5 kW in 10-hour cycle time for three days. The characteristic values averaged over three days are shown in Table 1. The results of the conventional moving bed using eight chambers are also shown for comparison.

TABLE 1

|  | Method of the present invention 450φ × 1.2 mH × 16 chambers | Conventional 8-chamber method 9000φ × 1.6 mH × 8 chambers |
| --- | --- | --- |
| Total resin filled | 3 m³ | 8 m³ |
| Recovery rate of product | 93% | 89% |
| Amount of alkali used | 0.015 | 0.024 |
| Purity of product | 94.5 | 94.0 |
| Recovered product concentration | 21 wt % | 18 wt % |
| Operating condition | 1 hour for each cycle | 4 hours for each cycle |
| Driving power* | 75 | 100 |

*Ratio of power with the conventional power required taken as 100.

Table 1 clearly indicates that although it uses a smaller amount of ion exchange resin, the method of this invention has better performance than the conventional 8-chamber method in terms of recovery rate of product, product purity and recovered product concentration, resulting in less amount of alkali used and driving power required.

In summary, this invention offers the following advantages. Because the method of this invention can put the liquid to be processed in contact with adsorbents in any type of flow—upward or downward flow as well as parallel or countercurrent flow—such processes as regeneration and desorption can be done efficiently. The ability to perform an ideal countercurrent flow operation achieves a high product recovery rate. Further, the progressive and complete contact with adsorbents results in high concentration of the product. The system is easy to manipulate and highly reliable, and requires less amount of driving power than the conventional system.

We claim:

1. A fluid distribution apparatus, comprising:

a first fluid distributor; and a second fluid distributor;

said first fluid distributor comprising:

a fixed supply valve;

a rotary valve rotated in sliding contact with the fixed supply valve; and a pipe fixing plate in sliding contact with the rotary valve;

said rotary valve being held between the fixed supply valve and the pipe fixing plate, the rotary valve having a fluid distribution section and a communication section, the fluid distribution section having a plurality of passages and the communication section having a plurality of communication passages and connection chambers;

said fixed supply valve having a plurality of supply grooves formed in a sliding contact surface thereof and a plurality of supply nozzle ports cut in a circumferential wall thereof for communicating the supply grooves with supply nozzles;

said pipe fixing plate having a plurality of communication passages connected to processing chambers and a plurality of connection passages connected at one of their ends with the connection chambers and at the other of their ends with connection pipes;

wherein the supply nozzle ports and the supply grooves in the fixed supply valve, the passages in the fluid distribution section of the rotary valve, the communication passages in the communication section of the rotary valve, and the communication passages in the pipe fixing plate are successively connected to form fluid supply passages running through the first fluid distributor; and wherein the connection passages in the pipe fixing plate, the connection chambers in the rotary valve, the connection pipes and communication passages in the second fluid distributer are connected to form chamber-to-chamber connection passages running from one processing chamber to another processing chamber through the second fluid distributor, to permit fluid flow from one processing chamber to another processing chamber.

2. A fluid distribution apparatus according to claim 1, wherein the fixed supply valve is cylindrical, and the fluid distribution section of the rotary valve is a circular column inscribed in the fixed supply valve.

3. A fluid distribution apparatus according to claim 1, wherein the fixed supply valve and the rotary valve are both disk-shaped and in sliding contact with each other.

4. A fluid distributor apparatus according to claim 1, wherein said first fluid distributor is located above said second fluid distributor and said processing chambers are located intermediate between said first fluid distributor and said second fluid distributor.

5. A fluid distributor apparatus according to claim 1, wherein said second fluid distributor further comprises:
 a fixed outlet pipe;
 a rotary valve rotating in sliding contact with the fixed outlet pipe; and
 a pipe fixing plate in sliding contact with the rotary valve.

6. An artificial moving bed comprising:
 a fluid distribution apparatus including a first fluid distributor and a second fluid distributor;
 processing chambers filled with an absorbent arranged between the first and second fluid distributors; and
 connection pipes arranged between the first and second distributors;
 said first fluid distributor comprising:
  a fixed supply valve;
  a rotary valve rotated in sliding contact with the fixed supply valve; and
  a pipe fixing plate in sliding contact with the rotary valve;
 said rotary valve being held between the fixed supply valve and the pipe fixing plate, the rotary valve having a fluid distribution section and a communication section, the fluid distribution section having a plurality of passages and the communication section having a plurality of communication passages and connection chambers;

said fixed supply valve having a plurality of supply grooves formed in a sliding contact surface thereof and a plurality of supply nozzle ports cut in a circumferential wall thereof for communicating the supply grooves with supply nozzles;

said pipe fixing plate having a plurality of communication passages connected to processing chambers and a plurality of connection passages connected at one of their ends with the connection chambers and at the other of their ends with connection pipes;

wherein the supply nozzle ports and the supply grooves in the fixed supply valve, the passages in the fluid distribution section of the rotary valve, the communication passages in the communication section of the rotary valve, and the communication passages in the pipe fixing plate are successively connected to form fluid supply passages running through the first fluid distributor; and wherein the connection passages in the pipe fixing plate, the connection chambers in the rotary valve, the connection pipes and communication passages in the second fluid distributer are connected to form chamber-to-chamber connection passages running from one processing chamber to another processing chamber through the second fluid distributor, to permit fluid flow from one processing chamber to another processing chamber; and wherein processing chambers are disposed between the communication passages in the pipe fixing plate of the first fluid distributor and the second fluid distributor and connection pipes are disposed between the connection passages in the pipe fixing plate and the second fluid distributor.

7. An artificial moving bed according to claim 6, wherein the fixed supply valve in the fluid distribution apparatus is cylindrical, and the fluid distribution section of the rotary valve is a circular column inscribed in the fixed supply valve.

8. An artificial moving bed according to claim 6, wherein the fixed supply valve and the rotary valve in the fluid distribution apparatus are both disk-shaped and in sliding contact with each other.

9. A fluid distributor apparatus according to claim 6, wherein said first fluid distributor is located above said second fluid distributor and said processing chambers are located intermediate between said first fluid distributor and said second fluid distributor.

10. A fluid distributor apparatus according to claim 6, wherein said second fluid distributor further comprises:
 a fixed outlet pipe;
 a rotary valve rotating in sliding contact with the fixed outlet pipe; and
 a pipe fixing plate in sliding contact with the rotary valve.

11. A continuous adsorption method comprising providing an artificial moving bed comprising:
 a fluid distribution apparatus including a first fluid distributor and a second fluid distributor;
 processing chambers, filled with an absorbent, arranged between the first and second fluid distributors; and
 connection pipes arranged between the first and second distributors;
 said first fluid distributor comprising:
  a fixed supply valve;
  a rotary valve rotated in sliding contact with the fixed supply valve; and a pipe fixing plate in sliding contact with the rotary valve;

said rotary valve being held between the fixed supply valve and the pipe fixing plate, the rotary valve having a fluid distribution section and a communication section, the fluid distribution section having a plurality of passages and the communication section having a plurality of communication passages and connection chambers;

said fixed supply valve having a plurality of supply grooves formed in a sliding contact surface thereof and a plurality of supply nozzle ports cut in a circumferential wall thereof for communicating the supply grooves with supply nozzles;

said pipe fixing plate having a plurality of communication passages connected to processing chambers and a plurality of connection passages connected at one of their ends with the connection chambers and at the other of their ends with connection pipes;

wherein the supply nozzle ports and the supply grooves in the fixed supply valve, the passages in the fluid distribution section of the rotary valve, the communication passages in the communication section of the rotary valve, and the communication passages in the pipe fixing plate are successively connected to form fluid supply passages running through the first fluid distributor; and wherein the connection passages in the pipe fixing plate, the connection chambers in the rotary valve, the connection pipes and communication passages in the second fluid distributor are connected to form chamber-to-chamber connection passages running from one processing chamber to another processing chamber through the second fluid distributor, to permit fluid flow from one processing chamber to another processing chamber; and wherein processing chambers are disposed between the communication passages in the pipe fixing plate of the first fluid distributor and the second fluid distributor and connection pipes are disposed between the connection passages in the pipe fixing plate and the second fluid distributor which has an outlet; and wherein the processing chambers are divided into a plurality of groups, the processing chambers in each group are connected in series by the chamber-to-chamber connection passages or in parallel by branching the communication passage for the group in the communication section of the rotary valve, and each group of processing chambers is arranged in parallel with each other group of processing chambers;

the continuous adsorption method comprising the steps of:

supplying initial fluids to inlets of the groups of processing chambers through the fluid supply passages in the first fluid distributor of the fluid distribution apparatus;

passing each of the initial fluids down a corresponding group of processing chambers for fluid processing;

extracting processed fluids from outlets of the groups of processing chambers;

passing extracted fluids in reverse direction in the second fluid distributor to discharge the extracted fluids out of the artificial moving bed; and performing different processes in different groups of processing chambers simultaneously by repeating the above-mentioned supplying, passing each of the initial fluids, extracting and passing extracted fluids steps for each group in such a way as to complete the above-mentioned steps simultaneously for all groups;

after the processes in all of the groups of processing chambers are completed simultaneously, rotating the rotary valve to supply fluids from one of the groups to the next group of processing chambers.

12. A continuous adsorption method according to claim 11, wherein the fixed supply valve in the fluid distribution apparatus is cylindrical and the fluid distribution section of the rotary valve is a circular column inscribed in the fixed supply valve.

13. A continuous adsorption method according to claim 11, wherein the fixed supply valve and the rotary valve in the fluid distribution apparatus are both disk-shaped and in sliding contact with each other.

14. A continuous adsorption method according to claim 11, wherein said first fluid distributor is located above said second fluid distributor and said processing chambers are located intermediate between said first fluid distributor and said second fluid distributor.

15. A continuous adsorption method according to claim 11, wherein said second fluid distributor further comprises:

a fixed outlet pipe;

a rotary valve rotating in sliding contact with the fixed outlet pipe; and a pipe fixing plate in sliding contact with the rotary valve.

* * * * *